Inventors
KURT SCHRÖTER
HANS HELMUT COENENBERG

By Toulmin & Toulmin
Attorneys

United States Patent Office 3,255,854
Patented June 14, 1966

3,255,854
TORQUE RESPONSE FRICTION CLUTCH
Kurt Schröter, Lohmar, Rhineland, and Hans Helmut Coenenberg, Siegburg, Rhineland, Germany, assignors to Jean Walterscheid K.G., Siegburg, Rhineland, Germany
Filed Sept. 18, 1964, Ser. No. 402,981
Claims priority, application Germany, Oct. 18, 1963, W 35,461
7 Claims. (Cl. 192—54)

The invention relates to a controllable friction clutch with a coupling disk which is sprung resiliently between a so-called fixed disk and a pressure plate, and where the pressure may be lifted away from the friction surface. Clutches of this type usually have the disadvantage of their movable parts being difficult to centralize with sufficient accuracy to permit the required high speed operation. Space restrictions, especially in motor vehicles, also require compact and outwardly smooth constructions which are not found among the clutches now available. The known clutches are also not sufficiently resistant to overheating caused by prolonged operation.

In the present invention a plate spring is positioned under tension between the pressure plate and a cover plate that is secured to the fixed disk, the plate spring being provided with camming recesses in which balls are seated whose opposite sides are seated in similar recesses in the cover plate while the inner periphery of the plate spring being connected to the pressure plate for rotation therewith, the camming recesses in the cover plate being offset radially outwardly relative to the recesses in the plate spring so that when these parts are pressed together the plate spring will be tensioned radially as well as axially.

In a preferred form of this invention the pressure plate comprises an outer ring which engages the friction lining of the clutch disk directly and carries projecting ribs extending radially inwardly to an inner ring on which the inner periphery of the plate spring is supported. The ribs of the pressure plate fill the greater portion of the space between the pressure plate and the plate spring.

Another feature of this invention is that the pressure plate has rotatably mounted on it cranklike clutch operating levers whose cranklike ends are engaged by an axially movable ring to open or close the clutch, the levers being anchored to the cover plate by tension members connected to the levers by pivots spaced from the axes of the levers.

The cranklike levers preferably carry coiled springs around their axes, one end of each spring abutting against either the outer periphery of the plate spring or against the pressure plate, while the other end engages the crank lever at a distance from its axis. The coiled springs are preferably coiled coaxially around the shafts of the levers with one end of each spring extending parallel to the axis of its associated lever to form a pivotal connection between the lever and its anchored tension member.

Another feature of this invention is that the air exit openings in the periphery of the clutch housing are provided with temperature responsive flaps to regulate the passage of air accorrding to its temperature.

In the clutch of this invention the pressure plate is positively centralized automatically during operation. In this manner out of balance forces and vibrations are avoided, even at high speeds. Another advantage of this invention is that such centralization will be maintained, even during wearing down of the friction surfaces. Such positive automatic centralization will also result in less wear on the bearing surfaces.

With a pressure plate of such construction in combination with the plate spring the high ribs on the pressure plate will maintain effective air circulation for adequate cooling of the inside of thte clutch, the side which is subjected to the greatest thermal stresses being most effectively cooled. The pressure plate in conjunction with its ribs and the cover plate and plate spring form an effective centrifugal blower to keep up a permanent circulation of air. This will also keep the clutch free from dust produced by wearing of the friction surfaces. The automatic removal of such dust accumulations also permits better heat conduction through the clutch structure and better radiation of heat therefrom. In order to make the clutch also suitable in cases where a minimum temperature is necessary to permit proper functioning of the friction surfaces, the circulation of air is automatically controlled so that the clutch will quickly reach the required temperature.

In spite of its many advantages, the clutch as shown in the drawing, is of compact and rugged construction and is composed of only few parts of relatively simple form so that it can be easily assembled and repaired and will be inexpensive to manufacture.

The drawing shows one form of the friction clutch of this invention.

Figure 1:
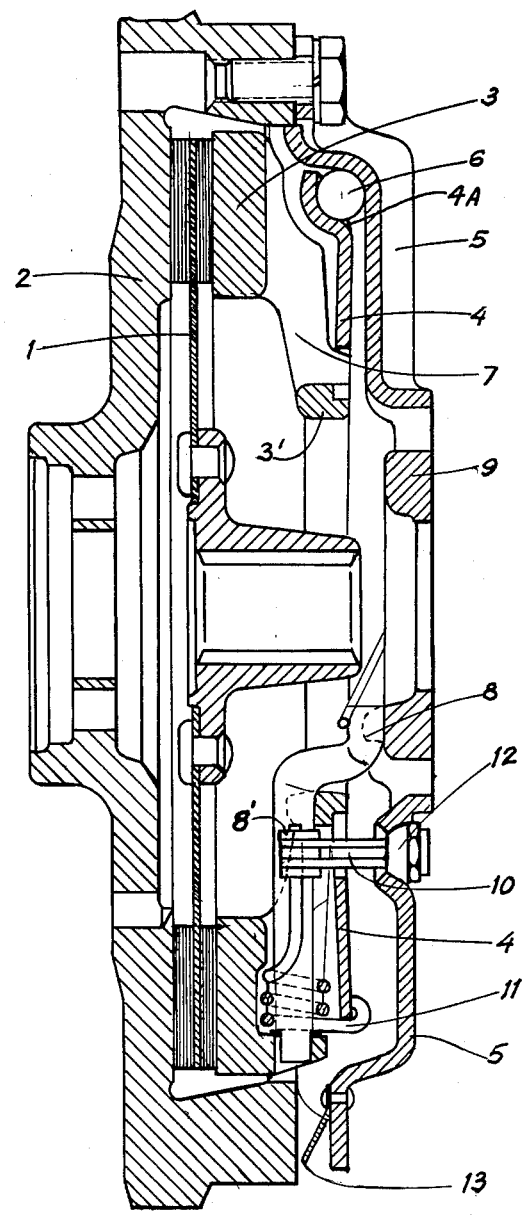
FIGURE 1 shows a longitudinal section through the clutch.
Figure 2:
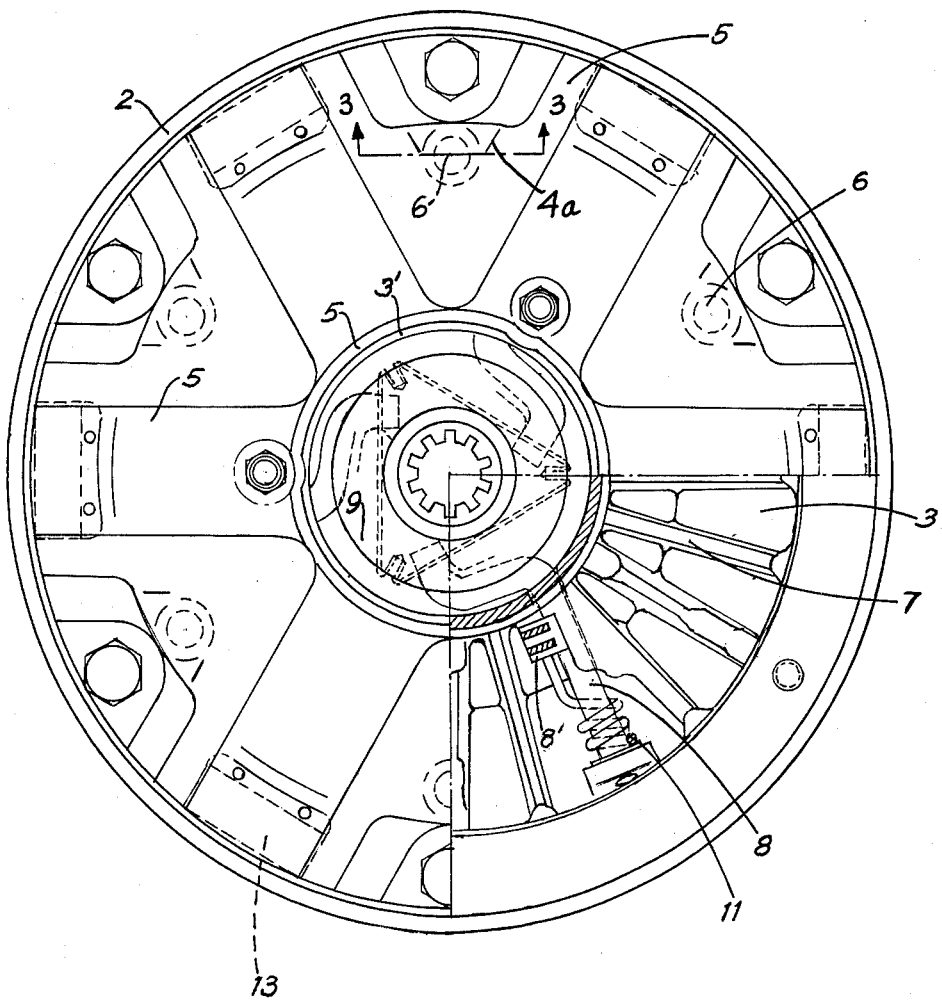
FIGURE 2 shows a view in the axial direction, partly in section.
Figure 3:
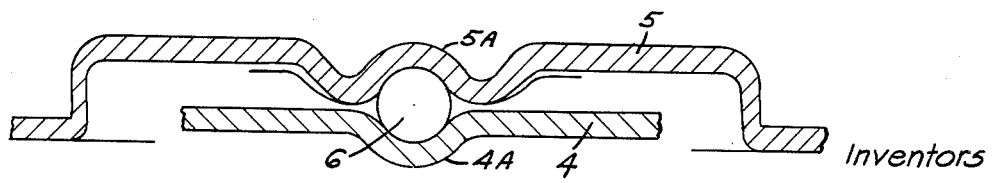
FIGURE 3 shows a section taken along the line 3—3 in FIGURE 2 in enlarged scale and showing the cam recesses.

A fixed disk 2, which usually serves as the flywheel of the driving machine, is rigidly secured to the drive shaft (not shown). The driven shaft, which is also not shown, is slidably but non-rotatably connected to the clutch disk 1 which carries the friction linings and which is positioned between the fixed disk 2 and a so-called pressure plate 3. The latter supports a plate spring 4 at its inner periphery with interengaging lugs for rotation therewith. At its outer periphery the plate spring 4 abuts against balls 6 which are engaged by the inner surface of the cover plate 5. The balls 6 are positioned in camming recesses 4A and 5A, respectively, in both the plate spring 4 and the cover plate 5.

The outer ring of the pressure plate 3 carries upwardly projecting ribs 7 extending radially inwardly where they terminate in a smaller ring 3'. The latter supports the plate spring 4 against both radial and axial forces. The pressure plate 3 has cranklike disengaging levers 8 rotatably mounted on it, the levers acting upon a ring 9 coaxial with the drive shaft. The levers 8 have an integral laterally projecting arm 8'. Tension members 10 are connected to the arms 8' of the levers 8 eccentrically of their axes of rotation and in cooperation with adjustable nuts 12, support these levers from the cover plate 5. The shaft of each lever 8 has a coiled spring wound upon it, one end of which abuts against the outer periphery of the plate spring 4. This method of support can however be substituted by a direct abutment of that end of the spring 11 against the pressure plate 3. The other end of each spring 11 extends parallel to the axis of its lever 8 and serves as a pivotal connection between each crank lever and its tension member 10. In the air escape openings between the fixed disk 2 and and the cover plate 5, heat responsive flaps 13 are mounted to control the flow of air in response to the temperature.

In consequence of the radial pretensioning of the plate spring 4, the latter is kept centralized to and pressed against the cover plate 5 by balls. Since the inner ring 3' of the pressure plate 3 also carries the pretensioned plate spring 4, the pressure plate 3 will be forceably guided coaxially to the cover plate 5 and to the fixed disk 2 and to its drive shaft, independently of the wearing away of the friction lining.

The coiled springs 11 on the cranklike disengaging levers 8 will keep these levers in their proper positions while the clutch is closed. When the ring 9 is shifted axially, the crank ends of levers 8 are engaged to rotate the levers. Since the tension members 10 which support the levers from the cover plate 5 are connected to the levers eccentrically, such rotation of the levers will cause them to move the pressure plate 3 away from the adjacent friction lining so that the clutch can be engaged or disengaged by axial shifting of the ring 9. Since the projecting ribs 7 of the pressure plate 3 extend across the greater part of the distance to the plate spring 4 and cover plate 5, the air in the clutch will be kept in radial outward movement by centrifugal force so as to keep the inside of the clutch air cooled, and by providing temperature responsive means such as flaps 13 for controlling the flow of air, the cooling can be regulated automatically. The self-acting regulating flaps 13 are formed of so-called bimetal which has the property of warping during temperature change. The effect of such warping will be to make the clearance space between the clutch part 2 and the pressure plate 5 larger or smaller.

In spite of the absence of the usual means for keeping the parts centralized, an effective centralization during operation is actually maintained, even if the plate spring 4 becomes defective as when a radial crack has formed, because there is enough of the spring remaining to keep the parts centralized.

As is clearly shown on the drawings, the compact arrangement of the cranklike levers results in a saving of space which is an important requirement in present day machine design practice.

It will be understood that this invention is susceptible to modification in order to adapt it to different usages and conditions and, accordingly, it is desired to comprehend such modifications within this invention as may fall within the scope of the appended claims.

What we claim is:

1. In a friction clutch assembly: a drive plate; a driven plate having friction facings; a pressure plate having a friction face on one side thereof disposed radially of the axis of said clutch assembly, said driven plate being between said drive plate and said pressure plate, said pressure plate having axially and radially extending ribs projecting from the other side thereof and terminating radially inwardly thereof, a ring member integrally joined to said terminal ends of said ribs and supported thereby; an annular cover plate connected to said drive plate; an annular plate spring positioned between said cover plate and said pressure plate; said ring member rotatably connecting the radially inner periphery of the plate spring with the pressure plate, the outer periphery of said plate spring and adjacent cover plate having registering camming recesses in which is positioned a camming ball, and means carried by said pressure plate and connected to said cover plate for moving the friction face of said pressure plate out of contact with one of said friction facings of the driven plate.

2. The invention defined in claim 1, said camming recesses in the cover plate being offset radially outwardly from the cooperating recesses in the plate spring so that when the plate spring and the cover plate are pressed together, the plate spring will be tensioned not only axially but also radially.

3. The invention defined in claim 1, said plate spring being spaced from said pressure plate and said radially extending ribs extending across the greater part of the said space between the pressure plate and the plate spring and operating as air circulating blades.

4. The invention defined in claim 1, said means comprising radially extending cranklike levers rotatably mounted on the pressure plate; said levers having an integral arm projecting from one side thereof, said projecting arm being pivotally connected to the cover plate by a tension member and means operatively connected to the crank end of the lever for rotating the lever about its axis, and means for returning the lever to its normal position.

5. The invention defined in claim 4, said means for operatively connecting the crank end of the levers comprising a ring positioned for axial movement and pivotally connected to the end of the levers for moving said ends axially inwardly and thereby rotating each lever on its axis to thereby put tension on said tension member and tend to draw the pressure plate away from said friction faces.

6. The invention defined in claim 4, said means for returning said levers to their normal positions comprising a spring encircling said lever coaxially thereof and having one end secured to the periphery of the plate spring and the other end thereof operating as a pivotal connection between the crank lever and the tension member.

7. The invention defined in claim 2, wherein ventilating passageways are provided between the peripheral edge of the cover plate and drive plate, and heat-responsive flaps positioned therein for controlling the circulation of air therethrough.

References Cited by the Examiner

UNITED STATES PATENTS 2,095,094 10/1937 Glasner.
2,230,520 2/1941 Wemp _____ 192—54 X
3,018,863 1/1962 Elfes _____ 192—89 X

FOREIGN PATENTS 940,011 10/1963 Great Britain.

DAVID J. WILLIAMOWSKY, Primary Examiner.

DON A. WAITE, Examiner.

B. W. WYCHE, III, Assistant Examiner.